United States Patent
Wolf (10) Patent No.: US 11,545,715 B2
(45) Date of Patent: Jan. 3, 2023

(54) REVERSIBLE BATTERY TRAY

(71) Applicant: PACCAR Inc, Bellevue, WA (US)

(72) Inventor: Chase Jay Wolf, Denton, TX (US)

(73) Assignee: PACCAR Inc, Bellevue, WA (US)

( * ) Notice: Subject to any disclaimer, the term of this patent is extended or adjusted under 35 U.S.C. 154(b) by 83 days.

(21) Appl. No.: 16/905,595

(22) Filed: Jun. 18, 2020

(65) Prior Publication Data

US 2021/0399267 A1 Dec. 23, 2021

(51) Int. Cl.
*H01M 50/267* (2021.01)
*H01M 50/20* (2021.01)
*H01M 50/209* (2021.01)
*H01M 50/207* (2021.01)
*H01M 50/249* (2021.01)

(52) U.S. Cl.
CPC ......... *H01M 50/267* (2021.01); *H01M 50/20* (2021.01); *H01M 50/207* (2021.01); *H01M 50/209* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 4,327,809 A | 5/1982 | Fenstermaker | |
| D269,672 S * | 7/1983 | Seltzer | D13/119 |
| 4,529,053 A | 7/1985 | Tucker | |
| D332,442 S * | 1/1993 | Simpson, Sr. | D13/119 |
| 6,521,371 B1* | 2/2003 | Lavanture | H01M 50/20 429/100 |
| 7,128,999 B1 | 10/2006 | Martin et al. | |
| 7,543,666 B2 | 6/2009 | Connelly et al. | |
| 10,023,069 B2 | 7/2018 | Kobayashi et al. | |
| 2010/0330404 A1* | 12/2010 | Nishino | H01M 50/213 429/82 |
| 2018/0337374 A1 | 11/2018 | Matecki et al. | |
| 2018/0337377 A1* | 11/2018 | Stephens | B60L 50/64 |
| 2019/0259983 A1* | 8/2019 | Yi | H01M 50/213 |

FOREIGN PATENT DOCUMENTS

JP 11271409 A * 10/1999
JP 2012-101663 A 5/2012

* cited by examiner

*Primary Examiner* — Gregg Cantelmo
(74) *Attorney, Agent, or Firm* — Seed IP Law Group LLP (57) ABSTRACT

The present disclosure is directed to a reversible battery tray that has a plurality of first boundary reception areas at a first side, and a plurality of second boundary reception areas at a second side opposite to the first side. The first boundary reception areas have a first shape to receive a first type of battery with a corresponding second shape, and the second boundary reception areas have a third shape to receive a second type of battery with a corresponding fourth shape. The reversible battery tray may be positioned within a battery box such that the first side is exposed or the second side is exposed as selected by a user or an operator of a vehicle to utilize different types of batteries while also restraining movement of the selected type of battery by the user or the operator as well.

20 Claims, 7 Drawing Sheets

REVERSIBLE BATTERY TRAY

BACKGROUND

Technical Field

The present disclosure is directed to a battery tray for retaining and restraining batteries in a vehicle.

Description of the Related Art

Generally, vehicles such as cars, trucks, semi-trucks, aircraft, watercraft, and the like include a battery box system that receives batteries to help in operation of the vehicle. The batteries are generally received by a battery box and are placed on a battery tray that is positioned within the battery box. The battery trays are generally a flat piece of a rubber material or a composite material with raised edges around the periphery of the tray. The batteries are placed on the tray to help restrain the batteries from moving when the vehicle is being operated. A holding component is then utilized in combination with the battery tray to retain and restrain the batteries from being displaced when the vehicle is in use. The holding component is tightened down and applies pressure and force to surfaces of the batteries to hold the batteries in place when the vehicle is operated or in use.

There are significant challenges to providing a battery tray that receives multiple types of batteries having different shapes while still retaining and restraining movement of batteries with different shapes.

One significant challenge is restraining the movement of the batteries in the x-direction, the y-direction, and the z-direction such that the batteries do not contact each other or other components of the battery box resulting in damage to the batteries or the battery box. For example, a battery tray may properly restrain a first type of battery with a first shape, but may not properly restrain a second type of battery with a second shape that is different than the first shape. This may result in the second type of battery having a much shorter lifespan when compared to the first type of battery.

BRIEF SUMMARY

Embodiments of the present disclosure may overcome significant challenges associated with the battery tray as discussed above.

The present disclosure is directed to various embodiments of reversible battery trays with first boundary reception areas having a first shape on a first side of the battery tray, and second boundary reception areas having a second shape on a second side of the battery tray. The second side of the battery tray is opposite to the first side of the battery tray. The first boundary reception areas are configured to receive a first type of battery with a first shape, and the second boundary reception areas are configured to receive a second type of battery with a second shape.

The first boundary reception areas are surrounded by a plurality of first boundary portions that restrain the movement of the first type of battery, and the second boundary reception areas are surrounded by a plurality of second boundary portions that restrain movement of the second type of battery.

Some embodiments of the reversible battery tray may be positioned within a battery box such that the first boundary reception areas are exposed for batteries of the first type of battery to be received by the reversible battery tray as selected by a user or an operator, or may be positioned within the battery box such that the second battery reception areas are exposed for batteries of the second type of battery to be received instead. Accordingly, the embodiments of the reversible battery tray are capable of retaining and restraining the first type of battery with the first shape and the second type of battery with the second shape from moving in an x-direction and a y-direction while a vehicle is operated or in use.

Some embodiments of the reversible battery tray include a plurality of openings that are configured to receive a plurality of locating structures that position the embodiments of the battery tray within a battery box. Once the battery tray is in position and in place within the battery box, batteries are placed within the battery reception areas of the reversible battery tray. Once the batteries are in place, a holding component is coupled to the locating structures and is tightened down to restrain a z-direction movement of the batteries within the battery box.

BRIEF DESCRIPTION OF THE SEVERAL VIEWS OF THE DRAWINGS

In the drawings, identical references numbers identify similar elements or acts unless the context indicates otherwise. The sizes and relative proportion of the elements in the drawings are not necessarily drawn to scale.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures and components associated with vehicles such as trucks, cars, aircraft, watercraft, etc. have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second, third, fourth, etc., does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "left," and "right," are used for only discussion purposes based on the orientation of the components in the discussion of the Figures in the present disclosure as follows. These terms are not limiting as the possible positions explicitly disclosed, implicitly disclosed, or inherently disclosed in the present disclosure.

The term "substantially" is used to clarify that there may be slight differences when a battery tray is manufactured in the real world, as nothing can be made perfectly equal or perfectly the same. In other words, substantially means that there may be some slight variation in actual practice and instead is made within accepted tolerances.

As used in this specification and the appended claims, the singular forms "a," "an," and "the" include plural referents unless the content clearly dictates otherwise.

While various embodiments are shown and described with respect to battery trays and vehicles such as semi-trucks, it will be readily appreciated that embodiments of the present disclosure are not limited thereto. In various embodiments, the structures, devices, methods and the like described herein may be embodied in or otherwise utilized in any suitable type or form of a battery tray in any vehicle, and may be manufactured utilizing any suitable manufacturing technologies as desired.

FIGS. 1A-1E are directed to an embodiment of a battery tray 100 that is configured to be reversible or flipped, and is formed in such a manner so that the battery tray 100 receives a first type of battery on a first side 102 and a second type of battery on a second side 104 opposite to the first side 102. The first side 102 includes a plurality of first battery reception areas 106 having a first shape configured to receive the first type of battery, which can be seen in FIGS. 1A and 1B. The second side 104 includes a plurality of second battery reception areas 108 that have a second shape configured to receive the second type of battery, which can be seen in FIGS. 1C and 1D. The first shape of the first battery reception areas 106 is different than the second shape of the second battery reception areas 108. For example, the battery tray 100 may be reversed or flipped by a driver or a user of a vehicle when changing or replacing batteries in the vehicle if only certain types of batteries are available or if the driver or user has a preference for a specific type of battery utilized in the vehicle.

Figure 1A:
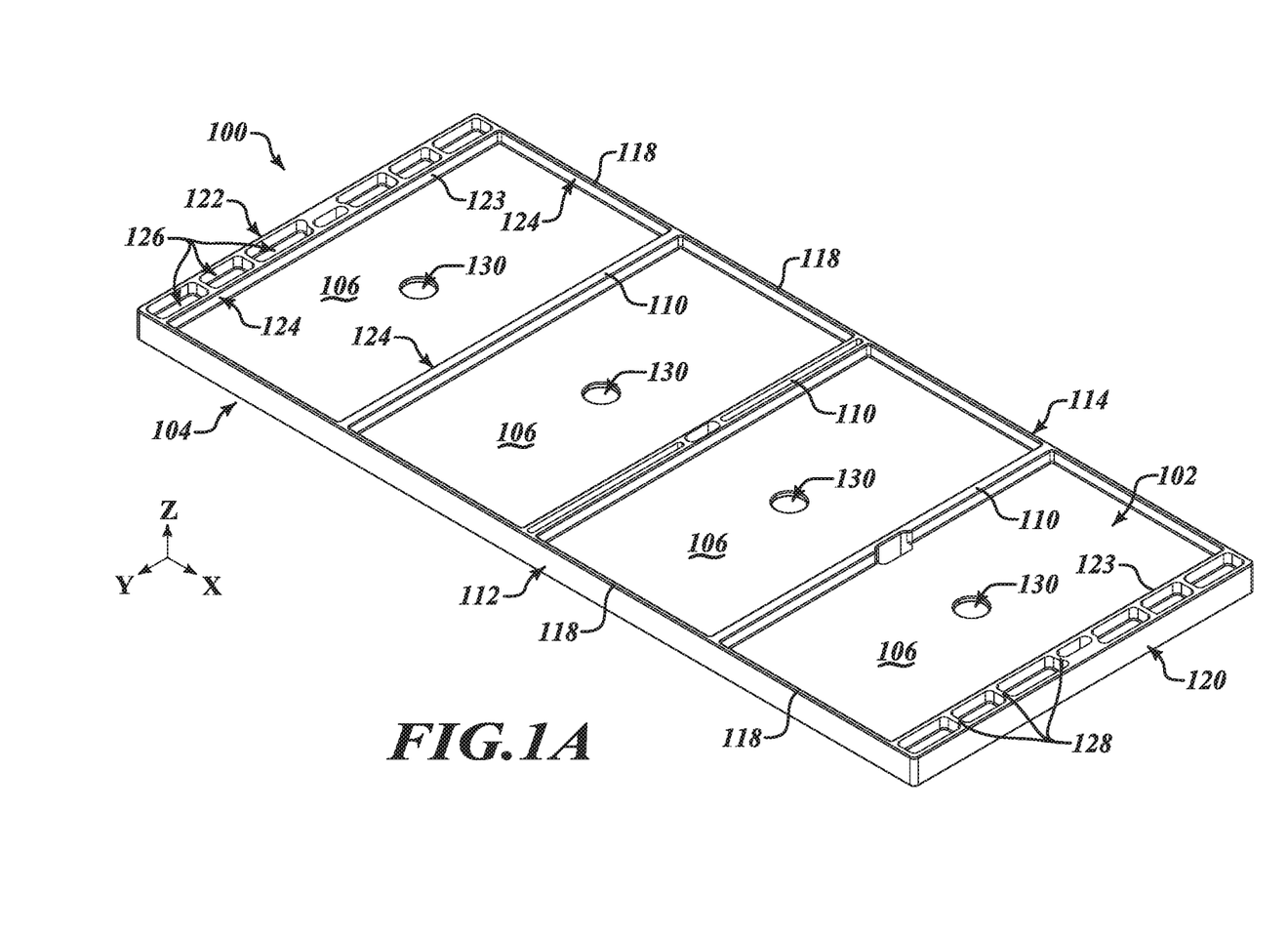
FIG. 1A is a perspective view of an embodiment of a battery tray.
Figure 1B:
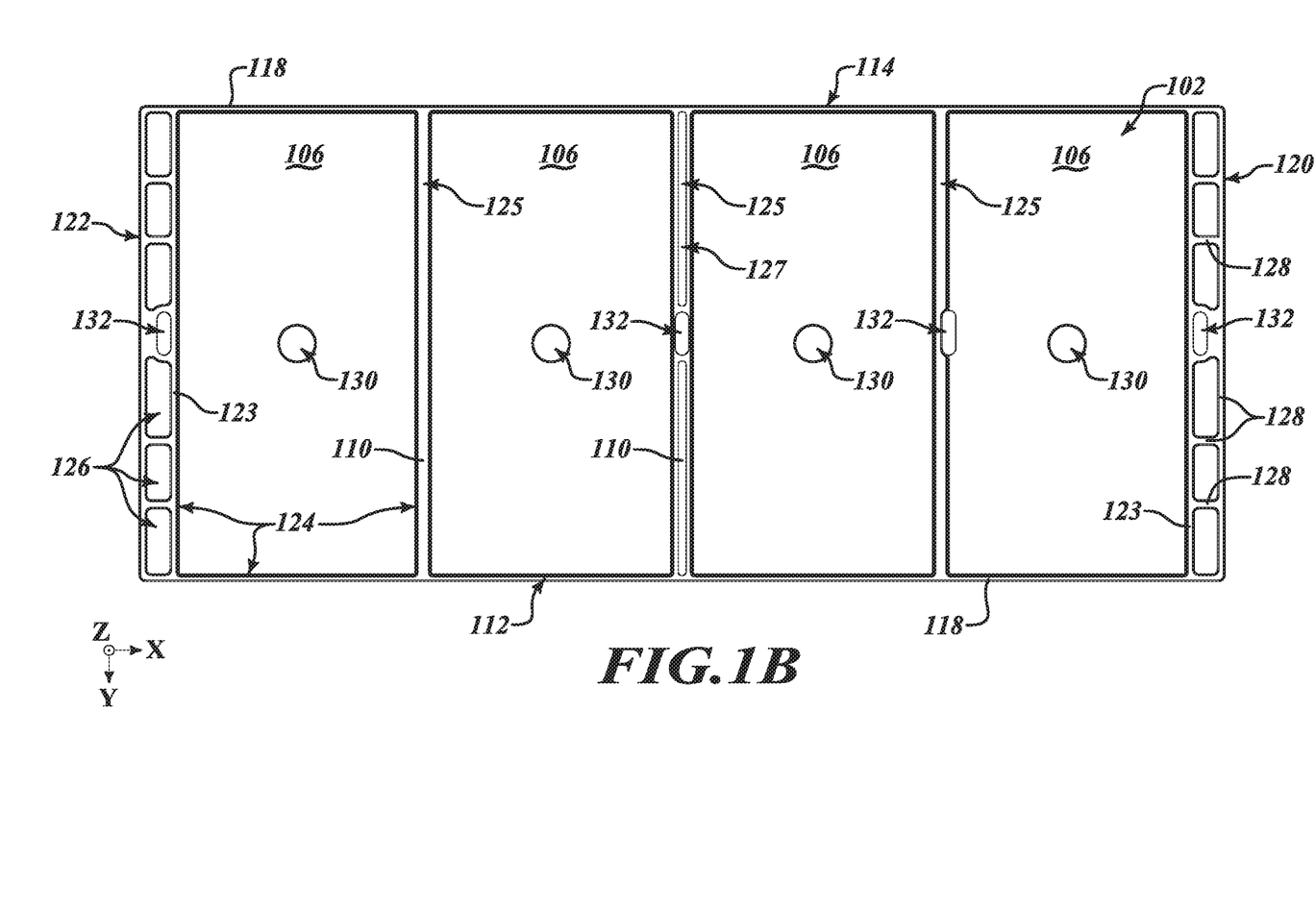
FIG. 1B is a top-plan view of the embodiment of the battery tray as shown in FIG. 1A.

FIG. 1A is a perspective view of the first side 102 the embodiment of the battery tray 100, and FIG. 1B is a top-plan view of the first side 102 of the embodiment of the battery tray 100 as shown in FIG. 1A.

As discussed earlier, the first side 102 of the battery tray 100 includes the first battery reception areas 106 having the first shape, which is a rectangular shape. The rectangular shape of the first battery reception areas 106 are configured to receive conventional rectangular shaped batteries utilized in vehicles such as cars, trucks, semi-trucks, watercraft, aircraft, etc.

In some other embodiments, the first shape of the first battery reception areas 106 may be an oval shape, a trapezoidal shape, a square shape, a triangular shape, a parallelogram shape, a rhomboidal shape or any other shape or combination of shapes configured to receive various types of batteries having corresponding shapes.

In some other embodiments, some of the first battery reception areas 106 may have a first shape and some of the first battery reception areas 106 may have a second shape that is different than the first shape. For example, the first shape may be a rectangular shape whereas the second shape may be a substantially trapezoidal shape with rounded corners, a substantially parallelogram shape with rounded corners, or a substantially rhomboidal shape with rounded corners.

A plurality of first boundary portions 110 extends across the battery tray 100 between a first edge 112 of the battery tray 100 and a second edge 114 of the battery tray 100. The second edge 114 is opposite to the first edge 112 and is spaced apart from the first edge 112. The first boundary portions 110 are positioned between and separate each of the first battery receptions areas 106 from each other. For example, the first boundary portion 110 on the left-hand side of FIG. 1B separates two of the first battery reception areas 106 that are adjacent to each other on the left-hand side of FIG. 1B. The first boundary portions 110 extend outward (in the z-direction) from the first battery reception areas 106 such that when batteries are positioned or placed within the first battery reception areas 106, the batteries are separated from one another by the first boundary portions 110.

This separation and spacing between the first battery reception areas 106 formed by the first battery boundary portions 110 separates and spaces apart batteries from each other on the battery tray 100 such that air may flow and pass between the batteries to reduce the likelihood of the batteries overheating when in use. The first boundary portions 110 also separate the batteries to reduce the likelihood that the batteries come into contact (e.g., hitting, bumping, slamming, etc.) with each other when the vehicle is being operated or driven. For example, when the vehicle is being utilized at a construction site, the ground may be very uneven causing the batteries to shift and vibrate. However, the first boundary portions 110 act as buffers, bumpers, or intermediary structures to stop the batteries from contacting each other reducing the likelihood of damaging the batteries when the vehicle is in hard use conditions (e.g., construction sites, lumber yards, shipping routes, etc.).

A plurality of second boundary portions 118 extend between a third edge 120 and a fourth edge 122 that are opposite to each other. The second boundary portions 118 extend between the first boundary portions 110. Some of the second boundary portions 118 extend along the first edge 112 of the battery tray 100, and some of the second boundary portions extend along the second edge 114 of the battery tray 100. The third edge 120 and the fourth edge 122 are transverse to the first edge 112 and the second edge 114. The third edge 120 and the fourth edge 122 extend between the first edge 112 and the second edge 114, and the first edge 112 and the second edge 114 extend between the third edge 120 and the fourth edge 122.

A plurality of third boundary portions 123 extend between the first edge 112 and the second edge 114. One of the third boundary portions 123 is positioned at the third edge 120 at the right-hand side of the battery tray 100 in FIG. 1B, and another of the third boundary portions 123 is at the fourth edge 122 of the battery tray 100 at the left-hand side of the battery tray 100 in FIG. 1B. The plurality of third boundary portions 123 include a plurality of depressions or voids 126 surrounded by a plurality of ribs 128. Some of the depressions 126 and some of the ribs 128 are adjacent to the third edge 120, and some of the depressions 126 and some of the ribs 128 are adjacent to the fourth edge 122. The ribs 128 act to increase rigidity of and strengthen the third edge 120 and the fourth edge 122 of the battery tray 100 as the ribs 128 allow for a greater amount of material to support the third edge 120 and the fourth edge 122, respectively.

A plurality of sidewalls 124 of the boundary portions 110, 118, 123 extend outward from the first battery reception areas 106. The sidewalls 124 surround each of the battery reception areas 106. Some of the sidewalls 124 are sidewalls of the first boundary portions 110, some of the sidewalls 124 are sidewalls of the second boundary portions 118, and some of the sidewalls 124 are sidewalls of the third boundary portions 123. The sidewalls 124 extend outward from the first battery reception areas 106 by the same amount as the first boundary portions 110 or the second boundary portions 118, respectively.

Each first battery reception area 106 has a first surface area that is bounded by the sidewalls 124, which define and surround the first surface area of each first battery reception area 106, respectively.

A plurality of surfaces 125 of the plurality of first boundary portions 110 is transverse (in the x-y plane) to the plurality of sidewalls 124. The surfaces 125 are positioned between and extend between at least two of the plurality of sidewalls 124. These sidewalls 124 and the surfaces 125 define the plurality of first boundary portions 110 that separate and space apart batteries that are placed or positioned in the first battery reception areas 106 of the battery tray 100. The surfaces 125 may be referred to as upper surfaces, top surfaces, or some other reference that refers to a surface that extends between some of the sidewalls 124 to define the first boundary portions 110.

A recessed 127 extends into the surface 125 of the first boundary portion 110 that is centrally located on the battery tray 100. The recess 127 may extend into the centrally located first boundary portion 110 by the same amount the first boundary portions 110 extend outward from the first battery reception areas 106.

In some embodiments of the battery tray 100, batteries in the battery tray 100 may be held slightly loose in the first battery reception areas 106. In these embodiments, the plurality of first battery reception areas 106, the sidewalls 124 of the plurality of first boundary portions 110 and the plurality of second boundary portions 118 restrict lateral movement of batteries in the battery tray 100 when the vehicle is in use or operated along an x-direction, a y-direction, or an xy-direction, which are defined by the xyz-coordinate system in FIG. 1A. In other words, the boundary portions 110, 118 work together to stop the batteries in the battery tray 100 from moving in the x-direction, the y-direction, or in any combination of the x-direction and the y-direction, which may be referred to as the xy-direction. For example, when one of the batteries moves in the x-direction in reaction to an external force, the battery will come into contact with one of the first boundary portions 110 and this will restrict lateral movement of the battery to avoid the battery from contacting any of the other batteries. In these embodiments, the batteries in the battery tray 100 are held in position or in place of the first battery reception areas 106 by the plurality of first boundary portions 110 and the plurality of second boundary portions 118.

In some other embodiments of the battery tray 100, batteries in the vehicle may be held tightly in the first battery reception areas 106. In these embodiments, sidewalls 124 of the plurality of first boundary portions 110, the sidewalls 124 of the plurality of second boundary portions 118, and sidewalls 124 of the third boundary portions 123 form an interference fit with the batteries in the battery tray 100. In these embodiments, the batteries in the battery tray 100 are held tightly in position or in place within the first battery reception areas 106 by the sidewalls 124 of the plurality of first boundary portions 110, the sidewalls 124 of the plurality of second boundary portions 118, and the sidewalls 124 of the plurality of third boundary portions 123.

In some other embodiments, there may be a combination of some batteries in the vehicle being held tightly in place by an interference fit as discussed earlier and loosely held in place as discussed earlier.

A plurality of first openings 130 extend into the first side 102 of the battery tray 100. Each first opening 130 extends into a corresponding one of the first battery reception areas 106. Each first opening 130 extends into a central region of the corresponding one of the first battery reception areas 106. Each first opening 130 is aligned with a center of the corresponding one of the first battery reception areas 106. The first openings 130 have a circular shape. However, in some other embodiments, the first openings 130 may have an oval shape, a triangular shape, a rectangular shape, or some other shape or combination of shapes. The first openings 130 extend entirely through the battery tray 100 from the first side 102 to the second side 104. Although the first openings 130 extend through the first battery reception areas 106, the areas of the first openings 130 are still considered part of the first areas of the first battery reception areas 106.

In some embodiments, the first openings 130 may extend through the first battery reception areas 106 at a region that is offset from the centers of the first boundary portions. In other words, in some embodiments, the first openings 130 may not be aligned with the centers of the first battery reception areas 106.

The first openings 130 are configured to act as drainage features such that liquid does not collect within the battery tray and is allowed to be able exit the battery tray 100. The first openings 130 reduce the likelihood of damage to batteries in the battery tray due to the buildup of liquid around the battery.

A plurality of second openings 132 extend into the first side 102 of the battery tray 100. The second openings 132 have a substantially ovular shape. However, in some embodiments of the battery tray 100, the second openings 132 may have a substantially circular shape, a substantially rectangular shape, or some other shape or combination of shapes. The second openings 132 extend entirely through the battery tray 100 from the first side 102 to the second side 104. At least one of the second openings 132 extends through the first boundary portion 110 positioned at the central region or center of the battery tray 100 as shown in FIG. 1B. At least one of the second openings 132 is adjacent to the third edge 120 and extends through the third boundary portion 123 at the right-hand side of FIG. 1B. At least one of the second openings 132 is adjacent to the fourth edge 122 and extends through the third boundary portion 123 at the left-hand side of FIG. 1B. At least one of the second openings 132 partially extends through the first boundary portion 110 to the right-hand side of the center of the battery tray 100, which is between the two first battery reception areas 106 at the right-hand side of the battery tray 100 as shown in FIG. 1B, and the first battery reception area 106, which is closest to the third edge 120 at the right-hand side of FIG. 1B. In some embodiments, there may be a one-to-one relationship between the second openings 132 and the first boundary portions 110 such that each second opening 132 extends through a corresponding one of the first boundary portions 110.

The second openings 132 are configured to act as reception features to hold the battery tray 100 in place when placed within a battery box, which will be discussed in greater detail with respect to a battery box system 400 disclosed in FIGS. 4A-4B.

Figure 1C:
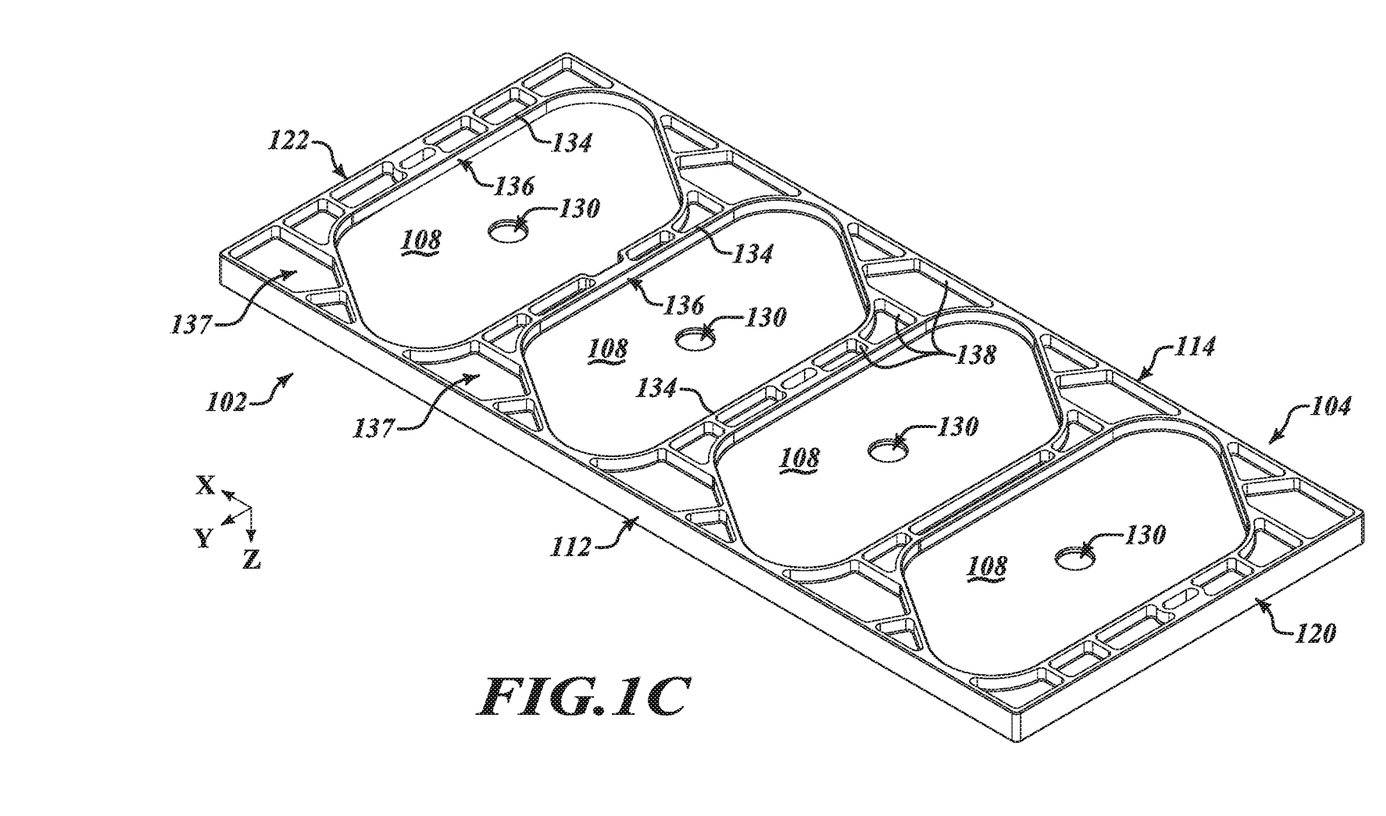
FIG. 1C is a perspective view of the embodiment of the battery tray as shown in FIGS. 1A-1B.
Figure 1D:
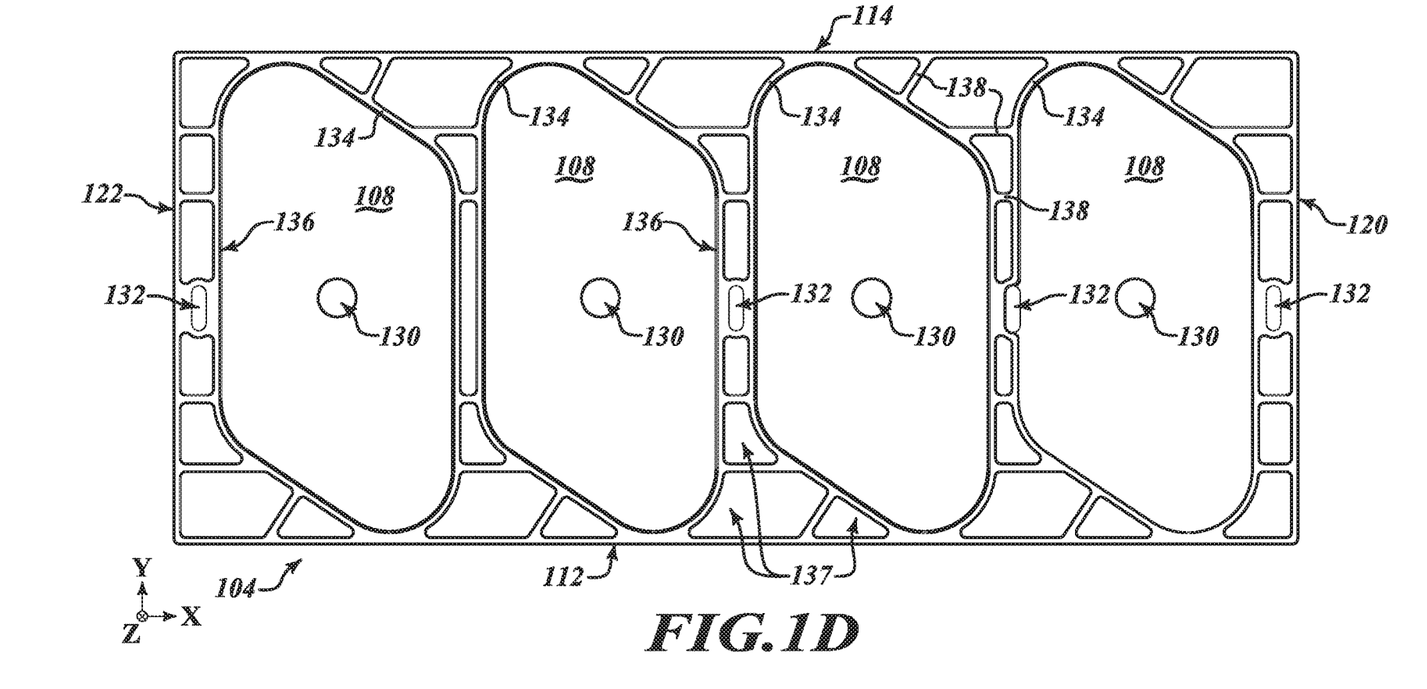
FIG. 1D is a bottom-plan view of the embodiment of the battery tray as shown in FIGS. 1A-1C.

FIG. 1C is a perspective view of the second side 104 of the battery tray 100 as shown in FIGS. 1A-1B, and FIG. 1D is a bottom plan view of the second side 104 of the battery tray 100 as shown in FIGS. 1A-1C.

As discussed earlier, the second side 104 incudes the plurality of second battery reception areas 108 having the second shape, which is a substantially parallelogram or rhomboidal shape with rounded or curved corners. The substantially parallelogram or rhomboidal shape of the second battery reception areas 108 are configured to receive conventional high-performance cylindrical shaped batteries utilized in vehicles such as cars, trucks, semi-trucks, watercraft, aircraft, etc. For example, one such known high-performance battery known within the industry are Optima branded high-performance batteries (e.g., Optima Battery D31A, Optima Battery D27A, etc.), which may be placed or positioned within the plurality of second battery reception areas 108.

In some embodiments, the second shape of the second battery reception areas 108 may be an oval shape, a rectangular shape, a square shape, a triangular shape, or any other shape or combination of shapes configured to receive various types of batteries.

Each second battery reception area 108 is aligned with and overlapping with a corresponding one of the first battery reception areas 106. By overlapping it is meant that at least a partial portion or partial region of each second battery reception area 108 is partially aligned with, coincides with, or extends over at least a partial portion or partial region of the corresponding one of the first battery reception areas 106. Each second battery reception area 108 has a center that is aligned with a center of the corresponding one of the first battery reception areas 106. The center of each of the first battery reception areas 106 is the center of the rectangular shape of each of the first battery reception areas. The center of each of the second battery reception areas 108 is the center of the substantially parallelogram or rhomboidal shape of each of the second battery reception areas 108. Each second battery reception area 108 is bounded within the corresponding one of the first battery reception areas 106. The center of each of the second battery reception area 108 may be aligned with the center of a corresponding one of the first battery reception areas 106 and vice versa.

In some embodiments, each second battery reception area 108 has a center that is not aligned with a center of the corresponding one of the first battery reception areas 106, and each second battery reception area 108 may not be bounded within the corresponding one of the first battery reception areas 106.

A plurality of fourth boundary portions 134 are within an interior of the battery tray 100. The plurality of fourth boundary portions 134 are separated from one another such that each of the second battery receptions areas 108 are separated and spaced apart from each other. The plurality of fourth boundary portions 134 have the substantially parallelogram or rhomboidal shape with rounded or curved corners as the plurality of second battery reception areas 108. The plurality of fourth boundary portions 134 extend outward (in the z-direction) from the second battery reception areas 108 such that when batteries are positioned or placed within the second battery reception areas 108, the batteries are separated from one another by the fourth boundary portions 134.

Similar to the first boundary portions 110 on the first side 102 of the battery tray 100, the separation and spacing between the second battery reception areas 108 formed by the fourth boundary portions 134 separates and spaces apart batteries on the battery tray 100 from each other such that air may flow and pass between the batteries to reduce the likelihood of the batteries overheating when in use. The fourth boundary portions 134 also separate the batteries to reduce the likelihood that the batteries come into contact (e.g., hitting, bumping, slamming, etc.) with each other when the vehicle is being operated or driven. For example, when the vehicle is being utilized at a construction site, the ground may be very uneven causing the batteries to shift and vibrate. However, the fourth boundary portions 134 act as buffers, bumpers, or intermediary structures to stop the batteries from contacting each other reducing the likelihood of damaging the batteries when the vehicle is in hard use conditions (e.g., construction sites, lumber yards, shipping routes, etc.).

A plurality of sidewalls 136 of the fourth boundary portions 134 extend outward form the second battery reception areas 108. The sidewalls 136 surround each of the second battery reception areas 108 and have the substantially parallelogram or rhomboidal shape with rounded or curved corners as the fourth boundary portions 134 and the second battery reception areas 108. The sidewalls 136 extend outward from the second battery reception areas 108 by the same amount as the fourth boundary portions 134.

Each second battery reception area 108 has a second surface area that is bounded by the sidewalls 136, which define and surround each second surface area of each second battery reception area 108, respectively. The second surface areas of the second battery reception areas 108 are less than the first surface areas of the first battery reception areas 106.

Similar to how the first battery reception areas 106 and the plurality of sidewalls 124 restrict the lateral movement of the batteries on the first side 102 of the battery tray 100, the second battery reception areas 108 restrict the lateral movement in the same manner. However, this discussion will not be reproduced for simplicity and brevity sake of the present disclosure.

Similar to how in some embodiments of the battery tray 100 in which the first battery reception areas 106 loosely hold the batteries, the second battery reception areas 108 may loosely hold batteries as well. However, this discussion will not be reproduced for simplicity and brevity sake of the present disclosure.

Similar to how in some embodiments of the battery tray 100 in which the first battery reception areas 106 hold the batteries tightly, the second battery reception areas 108 may tightly hold batteries as well. For example, the plurality of sidewalls 136 of the second battery reception areas 108 may form an interference fit with batteries in the battery tray 100. However, this discussion will not be reproduced for simplicity and brevity sake of the present disclosure.

In some of the embodiments, there may be a combination of some batteries in the vehicle held tightly in place by an interference fit as discussed earlier and loosely held in place as discussed earlier.

As discussed earlier the plurality of first openings 130 extend through each of the first battery reception areas 106. The first openings 130 also extend through each of the second battery reception areas 108 as well. Each first opening 130 extends into a corresponding one of the second battery reception areas 108. Each first opening 130 extends into a central region of the corresponding one of the second battery reception areas 108. Each first opening 130 is aligned with a center of the corresponding one of the second battery reception areas 108.

In some embodiments, the first openings 130 may extend through the second battery reception areas 108 at a region that is offset from the centers of the second battery reception areas 108. In other words, the first openings 130 may not be aligned with the centers of the second battery reception areas 108.

As discussed earlier, the plurality of second openings 132 extend into the first side 102 of the battery tray 100. The second openings 132 also extend through the second side 104 of the second battery reception areas 108. At least one of the second openings 132 extends through the second side 104 positioned at the central region or center of the battery tray 100 between the second battery reception areas adjacent to the center of the battery tray 100. At least one of the second openings 132 extends through the second side 104 positioned between the fourth edge 122 and the left most second battery reception area 108 as shown in FIG. 1D. At least one of the openings extends through the second side 104 positioned between the third edge 120 and the right most battery reception area 108 as shown in FIG. 1D. At least one of the second openings 132 extends through the second side 104 of the battery tray between the two second battery reception areas 108 at the right-hand side of the battery tray 100 as shown in FIG. 1D.

The second side 104 includes a plurality of depressions or voids 137 that are surrounded and defined by a plurality of ribs 138. The ribs 138 extend outward from the second side 104 of the battery tray 100 by a substantially similar amount as the fourth boundary portions 134 on the second side 104 of the battery tray 100. The ribs 138 extend between the second battery reception areas 108, extend between the first edge 112 and the second battery reception areas 108, extend between the second edge 114 and the second battery reception areas 108, extend between the third edge 120 and the second battery reception areas 108, and extend between the fourth edge 122 and the second battery reception areas 108. The ribs 138 on the second side 104 of the battery tray 100 act to increase the rigidity of and strengthen the battery tray 100 as a whole as the ribs 128 allow for a greater amount of material to support the entirety of the battery tray 100.

Figure 1E:
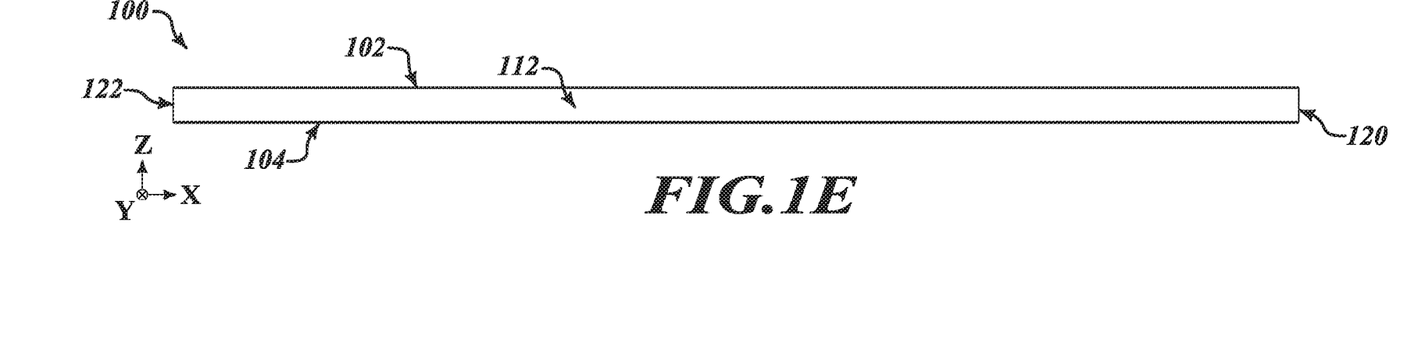
FIG. 1E is a side-plan view of the embodiment of the battery tray as shown in FIGS. 1A-1D.

FIG. 1E is directed to a side view of the embodiment of the battery tray 100 in FIGS. 1A-1D.

In some embodiments, the first battery reception areas 106 and the second battery reception areas 108 of the battery tray 100 may be a combination of various shapes. For example, some of the first battery reception areas 106 may be rectangular, and some of the first battery reception areas may be substantially trapezoidal in shape or may have a substantially parallelogram or rhomboidal shape. The second battery reception areas 108 of the battery tray 100 may be a combination of various shapes. For example, some of the second battery reception areas 108 may be substantially trapezoidal in shape or may have a substantially parallelogram or rhomboidal shape, and some of the second battery reception areas 108 may be shaped to be similar to two overlapping substantially trapezoidal shapes or two overlapping substantially parallelogram shapes or rhomboidal shapes. In other words, the battery tray 100 may be configured to receive multiple types of batteries with different shapes on the first side 102 at the same time and may be configured to receive multiple types of batteries with different shapes on the second side 104 at the same time.

Figure 2:
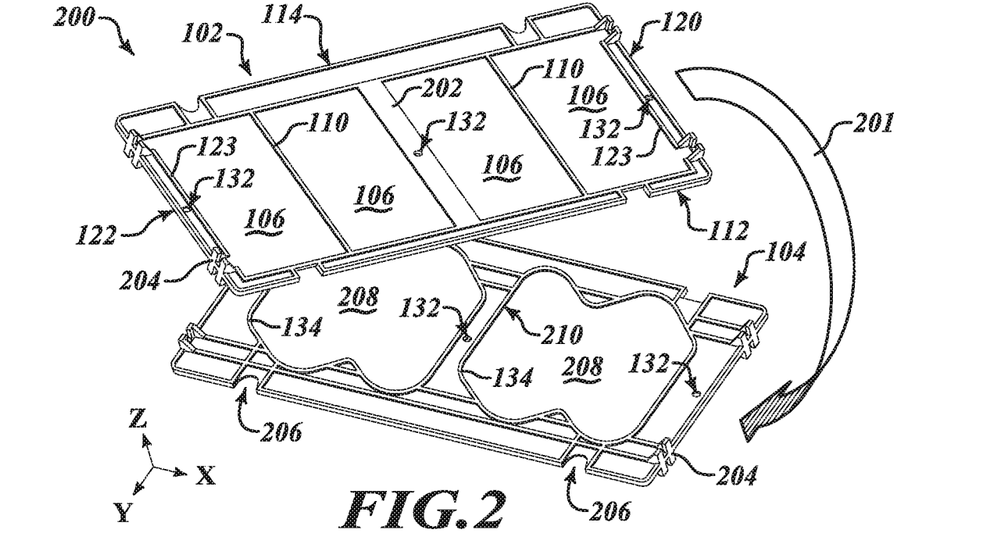
FIG. 2 is a perspective view of an alternative embodiment of a battery tray.

FIG. 2 is directed to an alternative embodiment of a battery tray 200 and shows how the embodiments of the battery tray 100, 200 may be flipped or reversed as illustrated by the arrow 201. This alternative embodiment of the battery tray 200 has similar features as the embodiment of the battery tray 100 as shown in FIGS. 1A-1E. Accordingly, only differences and distinctions between this alternative of the embodiment of the battery tray 200 and the battery tray 100 in FIGS. 1A-1E will be discussed in detail as follows.

The battery tray 200 has the first battery reception areas 106 with the rectangular shape on the first side 102 of the battery tray 200 like those as shown in FIG. 1B. The battery tray 200 further includes the first boundary portions 110 that are the same or similar to those in the battery tray 100 as shown in FIGS. 1A-1E. However, unlike the battery tray 100, the battery tray 200 includes a fifth boundary portion 202 that is positioned at a central region of the battery tray between two of the first battery reception areas 106. The fifth boundary portion 202 extends between the first edge 112, and the second edge 114. The fifth boundary portion 202 is wider than the first boundary portions 110. The first side has at least one of the second openings 132 extending through the fifth boundary portion 202 at a center of the battery tray 200.

In some embodiments, another second opening 132 extends through the first side 102 to the second side 104 at a location positioned between the left most first battery reception area 106 and the fourth edge 122, and another first opening 130 extends through the first side 102 to the second side 104 at a location positioned between the right most first battery reception area 106 and the third edge 120.

Unlike the battery tray 100, this alternative embodiment of the battery tray 200 includes first mounting structures 204 at the third edge 120 and the fourth edge 122 of the battery tray 200. The mounting structures 204 have an H-shape and are utilized to receive rods, pins, or some type of other component configured to position and hold the battery tray 200 within a battery box at a selected location or position, which will be discussed in more detail with respect to FIG. 3.

Unlike the battery tray 100, the alternative embodiment of the battery tray 200 includes second mounting structures 206 that are half-circles that extend into the first edge 112 and the second edge 114 of the battery tray 200. The second mounting structures 206 are utilized to receive rods, pins, or some other type of component to position and hold the battery tray 200 within a battery box at a selected location or position, which will be discussed in more detail with respect to FIG. 3.

Unlike the battery tray 100, this alternative embodiment of the battery tray 200 includes a plurality of third battery reception areas 208 that are on the second side 104 of the battery tray 200. The plurality of third battery reception areas 208 have a third shape, which is substantially two parallelogram shapes or rhomboidal shapes stacked on each other or overlapping with each other. In some embodiments, the plurality of third battery reception areas may be two trapezoids stacked on each other or overlapping with each other. The third battery reception areas include a plurality of sidewalls 210. The plurality of third battery reception areas 208 and the plurality of sidewalls 210 function in the same manner as the battery reception areas 108 and the sidewalls 136 as discussed earlier. In this embodiment of the battery tray 200, each of the plurality of fourth boundary portions 134 surrounds a corresponding one of the third battery reception areas 208 and have the same shape as the third battery reception areas 208.

In some embodiments, the third shape of the third battery reception areas 208 may be substantially rectangular, substantially triangular, substantially circular, or some other shape or combination of shapes configured to receive various types of batteries. In some embodiments, the third battery reception areas 208 may have a shape that is substantially two of the substantially parallelogram or rhomboidal shapes of the second battery reception areas 108 as shown in FIG. 1D stacked and overlapping each other. In some embodiments, the third battery reception areas 208 may have a shape that is substantially two or more trapezoidal shapes stacked and overlapping each other.

In some embodiments, the first battery reception areas 106 and the third battery reception areas 208 of the battery tray 200 may be a combination of various shapes. For example, some of the first battery reception areas 106 may be rectangular and some of the first battery reception areas may be substantially trapezoidal in shape or may have a substantially parallelogram or rhomboidal shape. The third battery reception areas 208 of the battery tray 200 may be a combination of various shapes. For example, some of the third battery reception areas 208 may have a substantially parallelogram or rhomboidal shape and some of the third battery reception areas 208 may be shaped to be similar to two overlapping substantially parallelogram or rhomboidal shapes. In other words, the battery tray 200 may be configured to receive multiple types of batteries on the first side 102 at the same time and may be configured to receive multiple types of batteries on the second side 104 at the same time.

The battery trays 100, 200 may be made of plastic material, a rubber material, a composite material, or some other material suitable for forming a battery tray. The battery trays 100, 200 may be formed through an injection technique, a compression technique, an extrusion technique, or some other formation technique suitable for forming a battery tray.

Figure 3:
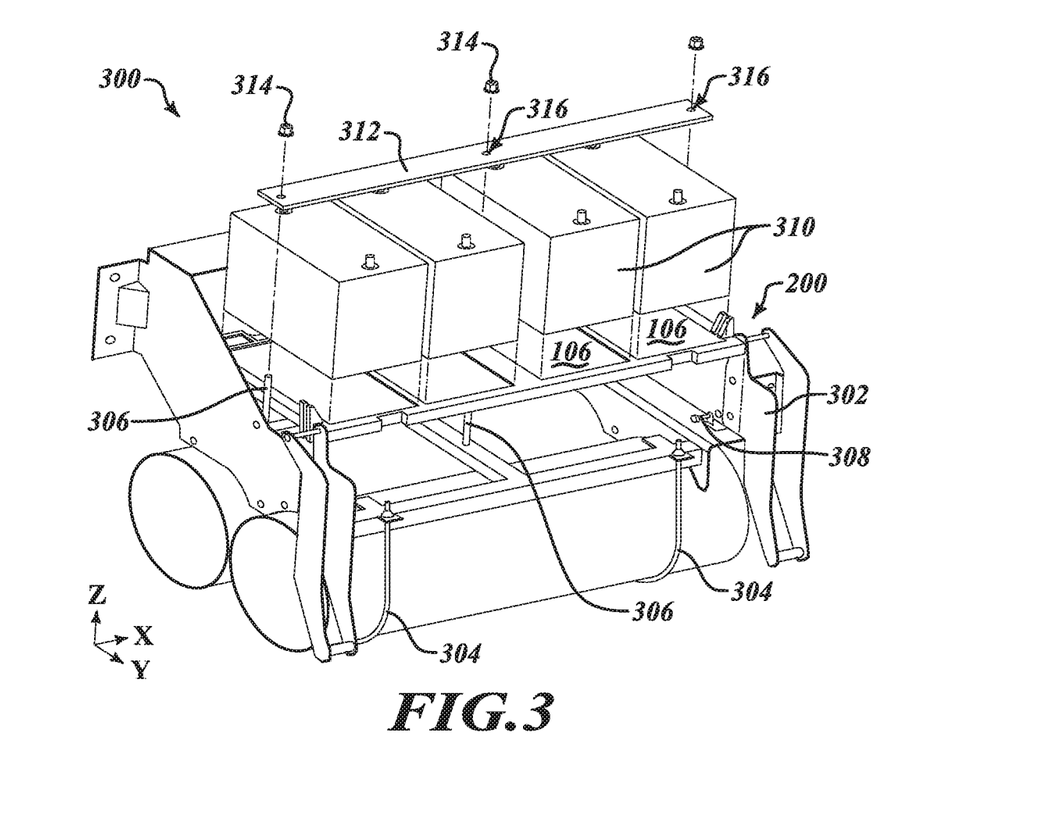
FIG. 3 is an exploded perspective view of an embodiment of a battery box system utilizing the alternative embodiment of the battery tray as shown in FIG. 2.

FIG. 3 is an exploded perspective view depicting a battery box system 300 utilizing the embodiment of the battery tray 200 as shown in FIG. 2.

The battery box system 300 includes a battery box 302 that receives the battery tray 200. A plurality of first locating structures 304 that extend in a vertical direction based on the orientation of the battery box 302 in FIG. 3. The first locating structures 304 interact with the second mounting feature 206 when the battery tray 200 is placed within the battery box 302. For example, the second mounting features 206 slide along the first locating structures 304 as the battery tray 200 is placed within the battery box 302 to guide the battery tray 200 into a selected position. The plurality of first locating structures 304 may be a plurality of rods, a plurality of pins, or some other locating structure or combination of locating structures.

The battery box system 300 includes a plurality of second locating structures 306 that extend in a vertical direction based on the orientation of the battery box 302 in FIG. 3. The first openings 130 receive the second locating structures 306 when placing the battery tray 200 in the battery box 302. For example, the first openings 130 slide along the second locating structures 306 as the battery tray 200 is placed within the battery box 302 to guide the battery tray 200 into the selected position. The plurality of second locating structures 306 may be a plurality of rods, a plurality of pins, a plurality of internally threaded rods, a plurality of externally threaded rods, or some other locating structure or combination of locating structures.

The battery box system 300 further includes a plurality of third locating structures 308 that extend in a horizontal direction based on the orientation of the battery box 302 in FIG. 3. The first mounting features 204 with the H-shaped structure receive the plurality of third locating features 308, which hold the battery tray 200 in the selected location or position within the battery box 302. The third locating structures 308 may be a plurality of rods, a plurality of pins, a plurality of internally threaded rods, or some other locating structure or combination of locating structures.

After the battery tray 200 is positioned within the battery box at the selected location by utilizing the locating structures 304, 306, 308, a plurality of batteries 310 are placed within the first battery reception areas 106. Each battery 310 is positioned within a corresponding one of the plurality of first battery reception areas 106.

After the batteries 310 are placed on the battery tray 200 within the first battery reception areas 106 accordingly, a holding component 312 is held in place by a plurality of fasteners 314 and the plurality of second locating structures 306, which pass through openings 316 in the holding component 312. Each of the second locating structures 306 has a threaded portion 306b and an unthreaded portion 306a, which can be seen in FIG. 4B. The threaded portion 306b has an outer surface that is threaded such that the fasteners 314 receive the threads of the threaded portion 306b. In this embodiment, the fasteners 314 are a combination of nuts and washers. Once the plurality of fasteners 314 are threaded onto the plurality of second locating structures 306 and are tightened down, the holding component 312 is held in place and comes into contact with the batteries 310 to hold the batteries 310 in place when a vehicle is in use or operated. The holding component 312, the plurality of fasteners 314, and the second locating structures 306 work together to restrain the movement of the batteries in the z-direction when a vehicle is in use or operated In some embodiments, there may be a small space between the holding component 312 and the batteries 310 to reduce stress and strain on the holding component 312 and the batteries 310 when a vehicle is being driven. For example, if the holding component 312 is tightened down too tight, the holding component 312 may fail more quickly due to larger amounts of bending or flexure in the holding component 312 when stopping the batteries from moving in the z-direction. Alternatively, if the holding component 312 is not tightened down enough and is too loose, the batteries 310 may move, vibrate, or oscillate too much such that the batteries may be damaged due to movement in the z-direction when a vehicle is operated or in use.

In some embodiments, the plurality locating structures 306 may be internally threaded or have sine other features such that the plurality of fasteners 314 may be interference fit fasteners, clamping fasteners, screw fasteners, or some other fastener or combination of fasteners to interact with the plurality of locating structures 306 to hold the holding component 312 in a position to keep the batteries 310 in place within the battery box 302.

Figure 4A:
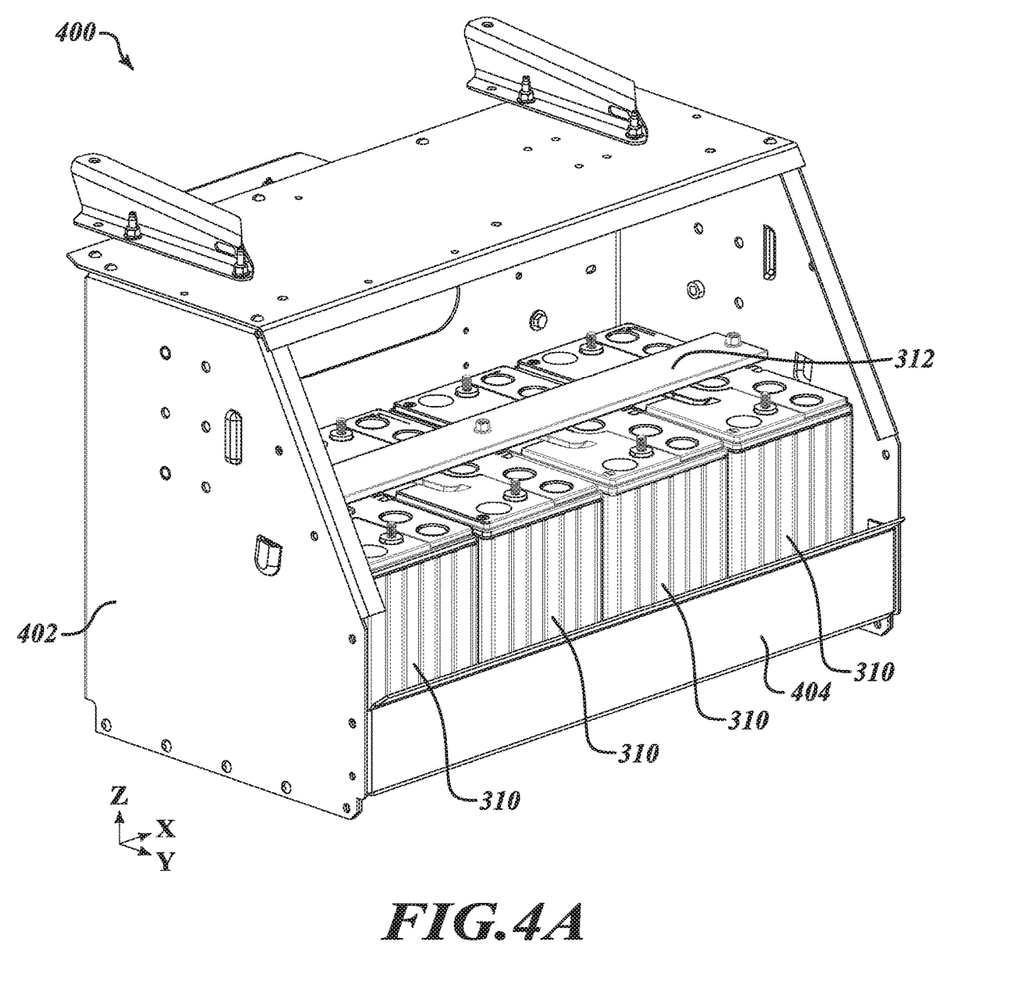
FIG. 4A is a perspective view an embodiment of a battery box system utilizing the embodiment of the battery tray as shown in FIGS. 1A-1D.
Figure 4B:
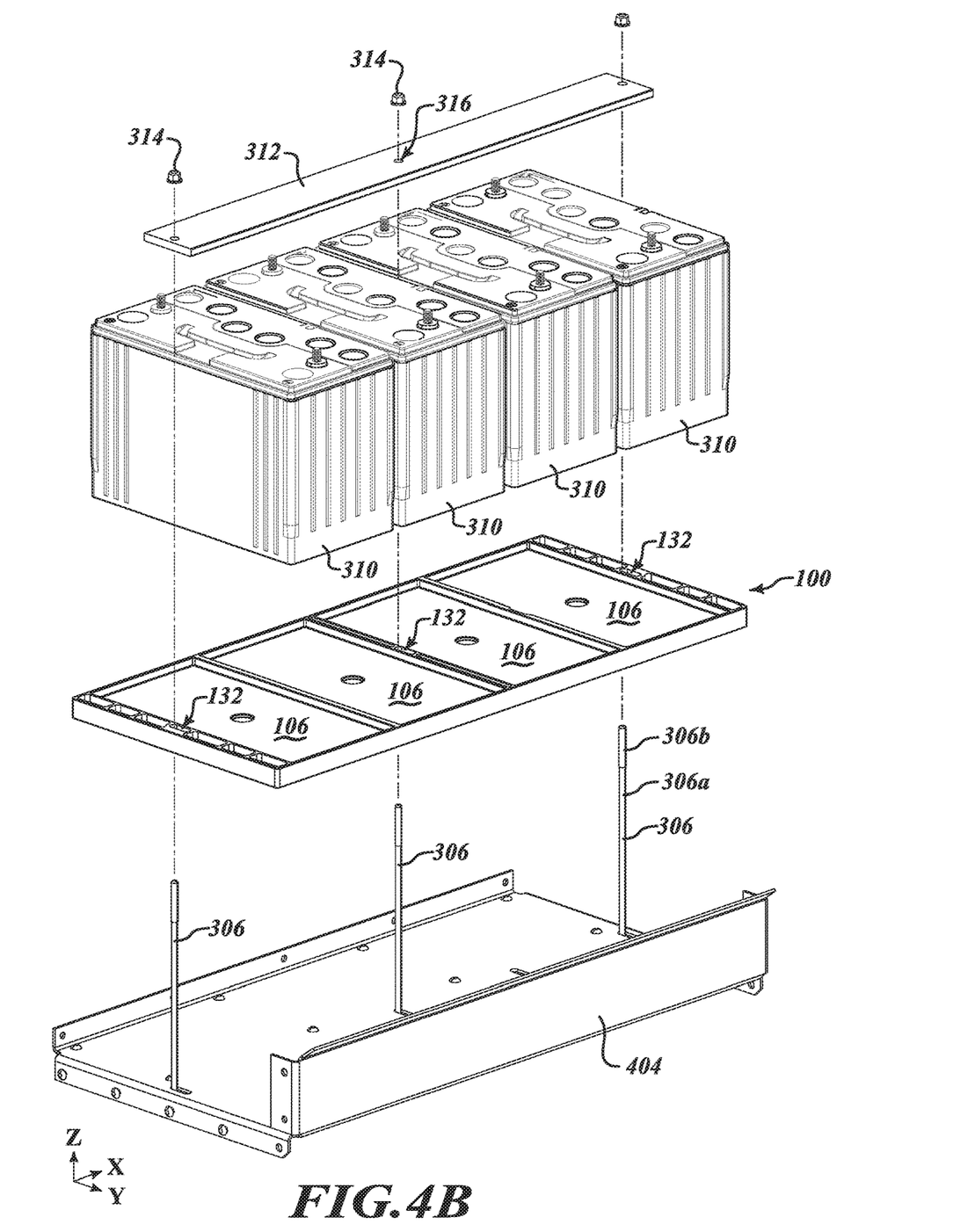
FIG. 4B is an exploded view of the embodiment of the battery boxy system utilizing the embodiment of the battery tray as shown in FIGS. 1A-1D and 4A.

FIG. 4A is a perspective view of a battery box system 400 utilizing the embodiment of the battery tray 100 as shown in FIG. 1. FIG. 4B is an exploded perspective view depicting the battery box system 400 as shown in FIG. 4A. The features of the battery box system 400 in FIGS. 4A-4B that are the same as those shown in FIG. 3 have the same reference numerals. Only differences between this embodiment of the battery box system 400 as shown in FIGS. 4A-4B and the battery box system 300 in FIG. 3 will only be discussed for simplicity and brevity sake.

Unlike the battery box system 300, the battery box system 400 has a slightly different battery box 402. The battery box 400 includes a reception portion 404 that receives the batteries 310, the battery tray 100, and the holding component 312. In the same manner as the openings 132 of the battery tray 200 receives the secondary locating structures 306, the openings 132 of the battery tray 100 receive the secondary locating structure 306.

At least one of these secondary locating structures 306, which can be seen to be located centrally on the battery reception portion 404, is positioned between two adjacent batteries 310. While this cannot be seen in FIG. 3, the secondary locating structure 306 in FIG. 3 is also positioned between two adjacent batteries 310 as well The battery reception areas 106, 108, 208 may be referred to as reception regions, recessed regions, recessed areas, recessed reception regions, or some other reference to a location at which batteries may be positioned and placed on the battery trays 100, 200.

The areas of the battery reception areas 106, 108, 208 may be referred to as surface areas, mounting areas, contact areas, battery location areas, or some other reference to an area or location of the battery trays 100, 200 configured to receive and hold batteries in place or position.

The boundary portions 110, 118, 123, 202 may be referred to as raised boundary portions, raised portions, boundary structures, buffer structures, bumper structures, or some other reference to structures or portions that stop the batteries from bumping into each other and that hold the batteries in place on the embodiments of the battery trays 100, 200 when a vehicle is operated.

The openings 132 may be referred to as holes, mounting features, mounting openings, or some other reference or language directed to an opening in which a rod or locating structure may pass through to position the battery tray within a battery box.

The openings 130 may be referred to as holes, drainage openings, drainage holes, or some other reference or language directed to a drainage feature that allows water to escape from a battery tray.

In the present disclosure, the embodiments of the battery trays 100, 200 include the battery receptions areas 106, 108, 208 that are surrounded by boundary portions 110, 134 202 such that batteries of various shapes may be restrained by the battery trays 100, 200 when a vehicle is in use.

For example and as discussed above, in the embodiment of the battery tray 100 shown in FIGS. 1A-1E the first battery reception areas 106 on the first side 102 are configured to receive and restrain a first type of battery with a rectangular shape, and the second battery reception areas 108 on the second side 104 are configured to receive and restrain a second type of battery with a substantially parallelogram or rhomboidal shape. In some embodiments, the second battery reception areas 108 on the second side 104 are configured to receive and restrain a second type of battery with a substantially trapezoidal shape or shape different from that of the first battery reception areas 106. By providing reception areas and boundary portions with different shapes on opposite sides of the battery tray 100, the batteries are well restrained. These batteries being restrained by the battery tray 100 results in the batteries being displaced less within a vehicle in use when compared to the prior art battery tray. This restraint of the batteries by the battery tray 100 reduces the likelihood of failure in the batteries during the use of a vehicle. While the above discussion is with respect to this advantage of the battery tray 100 when compared to the prior art battery trays, this advantage also applies to the embodiment of the battery tray 200 in FIGS. 2 and 3.

In view of the present disclosure and the discussions above, the battery trays 100, 200 include the battery reception areas 106, 108, 208 and the boundary portions 110, 134, 202 that restrain movement of the batteries in the vehicle. As a result of the battery reception areas 106, 108, 208 and boundary portions 110, 134, 202 of the battery trays 100, 200 that restrain x-direction and y-direction displacement of the batteries in the battery boxes 302, 402, reduces the amount of force/pressure that needs to be exerted on the surfaces of the batteries, which reduces the likelihood of cracks or damage prorogating within the batteries compared to when a greater amount of applied pressure and force is applied.

Battery trays 100, 200 include the battery reception areas 106, 108, 208 and the boundary portions 110, 134, 202 provide a clear indication of where the batteries should be placed within the battery trays 100, 200. Accordingly, a user or an operator of the vehicle may quickly see the optimal position for the batteries and place the batteries within the battery trays in the optimal position. This optimal position of the batteries on the battery trays 100, 200 spaces the batteries apart such that air flows between the batteries to cool the batteries when the vehicle is in use to help reduce the likelihood of overheating in the batteries.

While these are some of the advantages of the embodiments of the battery trays 100, 200 as disclosed in the present disclosure, these advantages are not an exhaustive list and there may be additional advantages over the prior art battery trays that have not been discussed above.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A battery tray, comprising:
   a first side and a second side opposite to the first side;
   a first recessed region on the first side, the first recessed region having a first shape to receive a first battery having a first profile that corresponds to the first shape; and
   a second recessed region on the second side, the second recessed region having a second shape to receive a second battery having a second profile that corresponds to the second shape, the second profile being different than the first profile, and the second shape being different from the first shape, and
   wherein the battery tray is configured to be flipped to alternately access one of the first recessed region and the second recessed region, and
   wherein at least one of the first shape of the first recessed region and the second shape of the second recessed region is substantially shaped as a rhomboid or overlapping rhomboids.

2. The battery tray of claim 1, wherein the first shape is substantially rectangular and the second shape is substantially shaped as a rhomboid.

3. The battery tray of claim 1, wherein a center of the first recessed region is aligned with a center of the second recessed region.

4. The battery tray of claim 3, wherein an opening extends through the center of the first recessed region and the center of the second recessed region, and the opening extends through the first recessed region to the second recessed region.

5. The battery tray of claim 1, wherein an opening extends through the first recessed region to the second recessed region.

6. The battery tray of claim 1, further comprising:
a first boundary portion that surrounds the first recessed region; and
a second boundary portion that surrounds the second recessed region.

7. The battery tray of claim 6, wherein the first boundary portion extends outward from the first side and the second boundary portion extends outward from the second side.

8. The battery tray of claim 1, further comprising:
a third recessed region on the first side, the third recessed region has a third shape, the third recessed region being adjacent to the first recessed region on the first side, the third recessed region overlapping with the second recessed region.

9. The battery tray of claim 8, wherein the first recessed region has a first surface area, the second recessed region has a second surface area, and the third recessed region has a third surface area, and the second surface area is larger than the first surface area and is larger than the third surface area.

10. A battery tray, comprising:
a first side and a second side opposite to the first side;
a first recessed region on the first side, the first recessed region having a first shape to receive a first battery having a first profile that corresponds to the first shape;
a second recessed region on the second side, the second recessed region having a second shape to receive a second battery having a second profile that corresponds to the second shape, the second profile being different than the first profile, and the second shape being different from the first shape; and
a third recessed region on the first side, the third recessed region has a third shape, the third recessed region being adjacent to the first recessed region on the first side, the third recessed region overlapping with the second recessed region, and
wherein the battery tray is configured to be flipped to alternately access the first and third recessed regions and the second recessed region, respectively, and
wherein the first shape and the third shape are substantially rectangular, and the second shape is substantially two parallelograms overlapping each other.

11. The battery tray of claim 1, wherein:
the first recessed region includes a first surface area;
the second recessed region includes a second surface area greater than the first surface area;
the first shape is substantially rectangular; and
the second shape is substantially two parallelograms overlapping each other.

12. A battery tray, comprising:
a first side and a second side opposite to the first side;
a plurality of first recessed regions in the first side, each of the plurality of first recessed regions having a first shape to receive a battery with a first profile; and
a plurality of second recessed regions in the second side, each of the plurality of second regions having a second shape to receive a battery with a second profile, the second shape being different from the first shape, the second profile being different from the first profile, and each of the plurality of second recessed regions in the second side overlapping at least one of the plurality of first recessed regions in the first side, and
wherein the battery tray is configured to be flipped to alternately access the plurality of first recessed regions and the plurality of second recessed regions, and
wherein at least one of the first shape of the first recessed region and the second shape of the second recessed region is substantially shaped as a rhomboid or overlapping rhomboids.

13. The battery tray of claim 12, wherein the first shape is substantially rectangular and the second shape is substantially shaped as a rhomboid.

14. The battery tray of claim 12, wherein a center of each first recessed region is aligned with a center of each second recessed region.

15. The battery tray of claim 12, wherein a plurality of openings extend through a center of each first recessed region and a center of a second recessed region, each opening extending from the first side to the second side.

16. The battery tray of claim 12, wherein the plurality of first recessed regions includes at least four first recessed regions, and the plurality of second recessed regions includes at least four second recessed regions.

17. The battery tray of claim 12, wherein the plurality of first recessed regions includes at least four recessed regions, and the plurality of second recessed regions includes at least two second recessed regions.

18. A battery tray, comprising:
a first side and a second side opposite to the first side;
a first battery reception area at the first side, the first battery reception area having a first shape to receive a battery with a first profile;
a first battery boundary portion surrounding the first battery reception area and extending outward from the first battery reception area;
a second battery reception area at the second side, the second battery reception area having a second shape to receive a battery with a second profile, the second shape is different from the first shape; and
a second battery boundary portion surrounding the second battery reception area and extending outward from the second battery reception area,
wherein the battery tray is configured to be flipped to alternately access the first battery reception area and the second battery reception area, and
wherein at least one of the first shape of the first recessed region and the second shape of the second recessed region is substantially shaped as a rhomboid or overlapping rhomboids.

19. The battery tray of claim 18, wherein an opening extends from the first battery reception area at the first side to the second battery reception area at the second side.

20. The battery tray of claim 18, wherein:
the first battery reception area is aligned with and overlapping with the second battery reception area, and has a first surface area; and
the second battery reception area has a second surface area that is less than the first surface area of the first battery reception area.

* * * * *